UNITED STATES PATENT OFFICE.

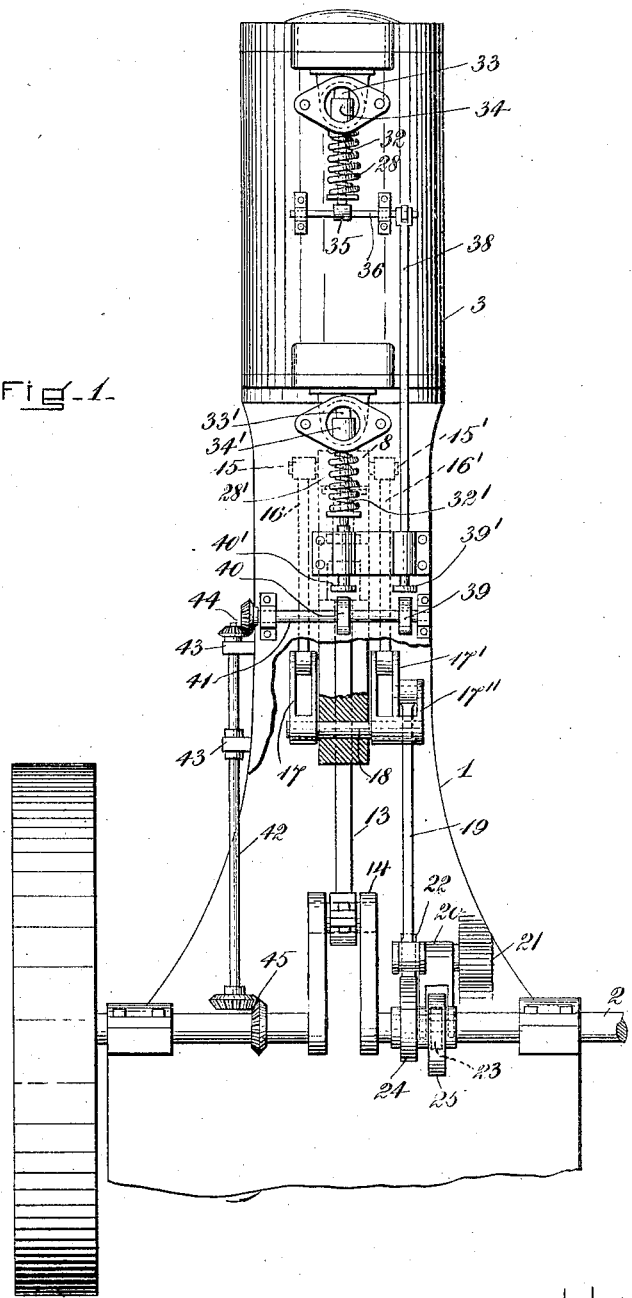

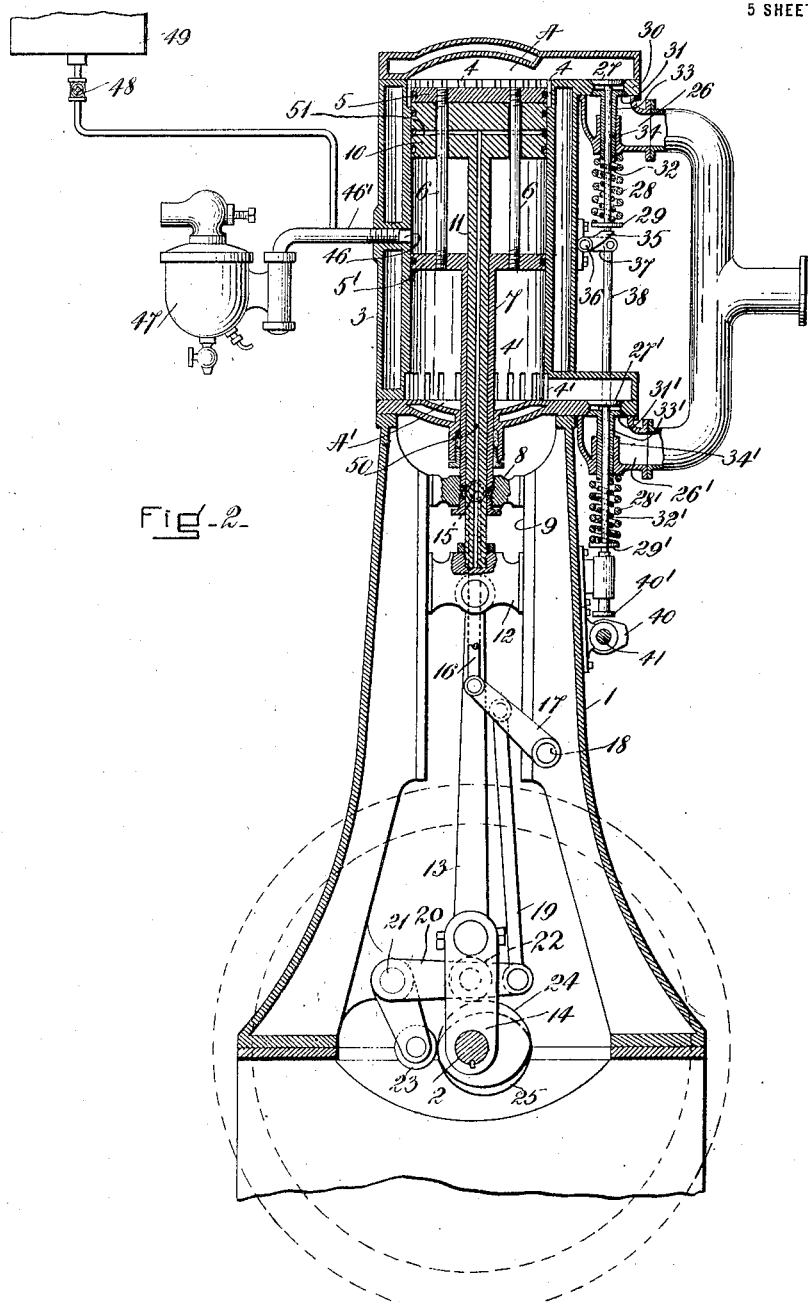

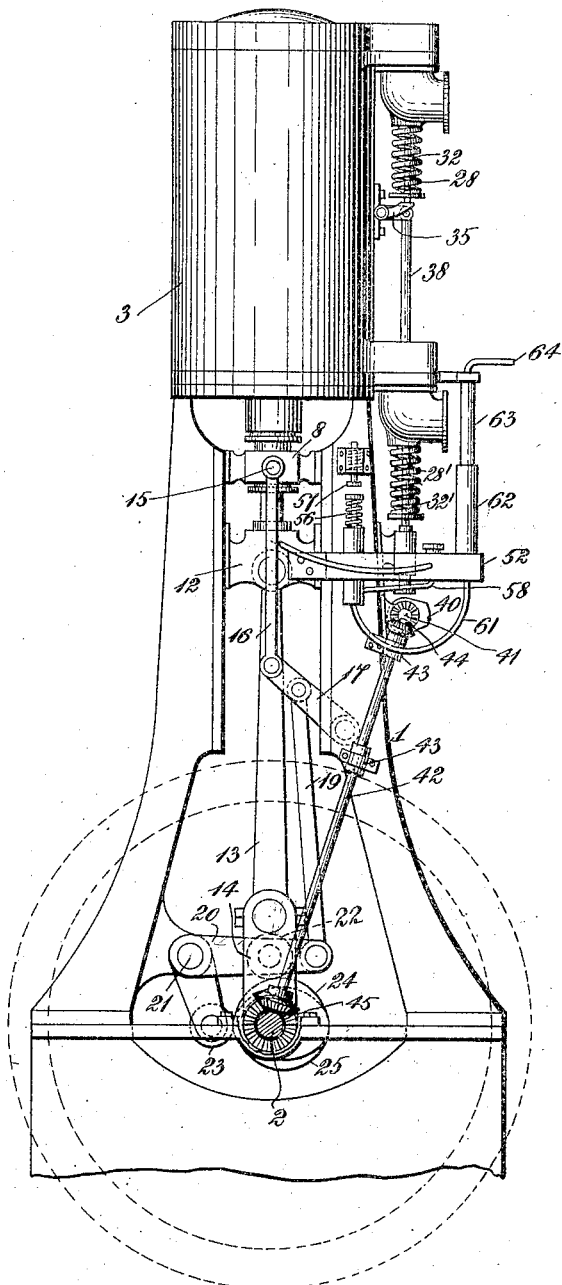

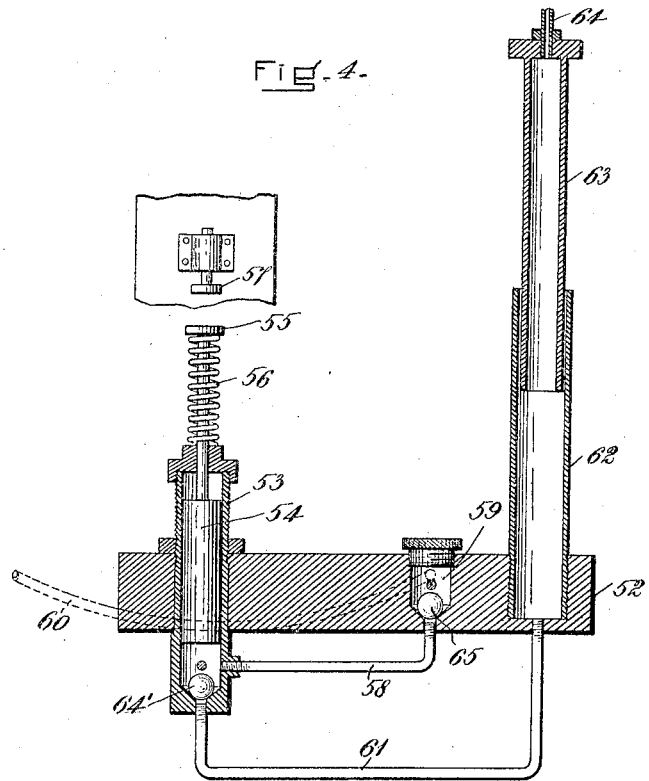
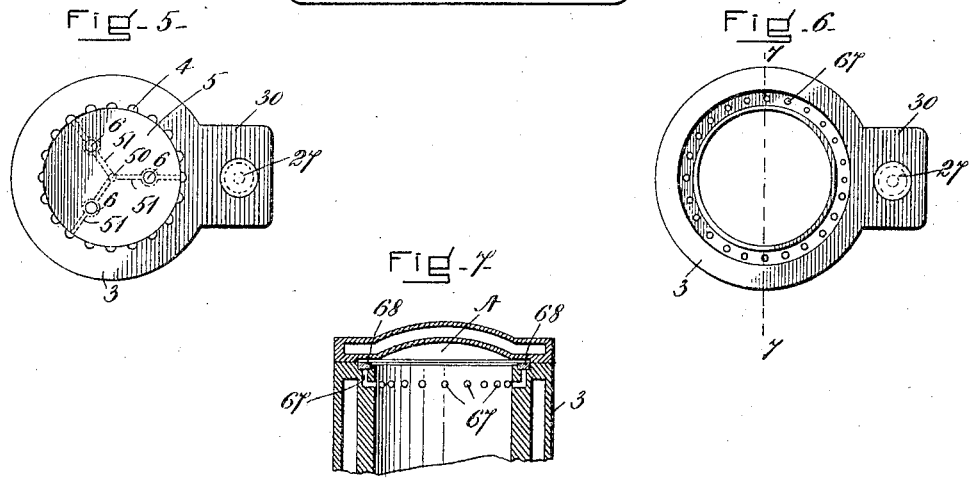

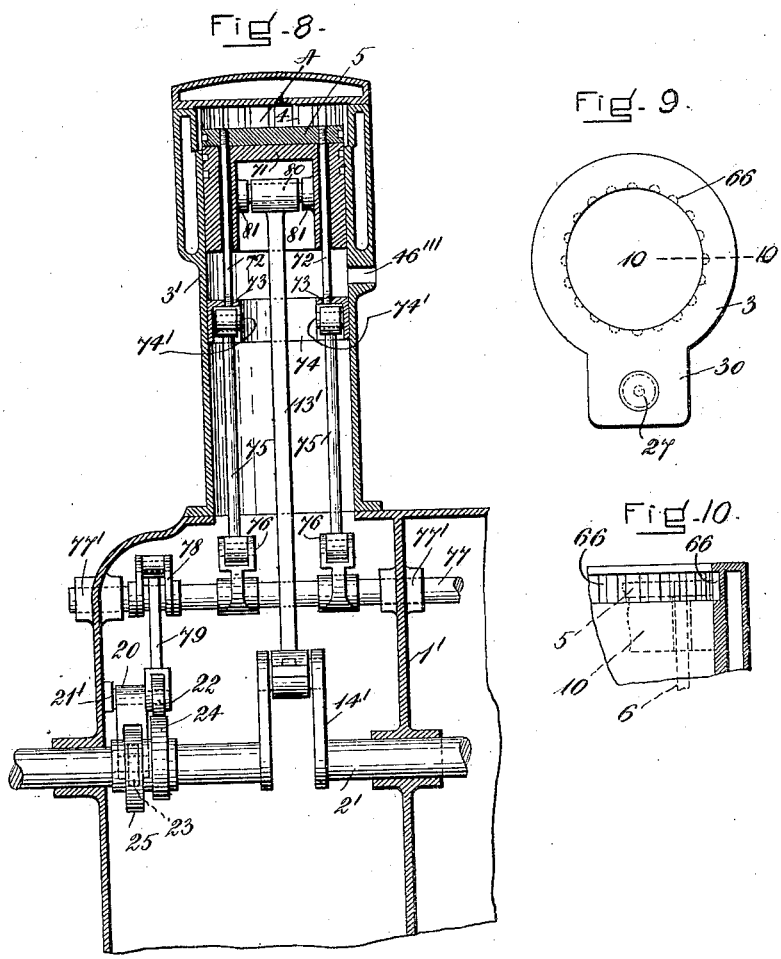

FRED HENRY GILE, OF SAUGUS, MASSACHUSETTS, ASSIGNOR, BY MESNE ASSIGNMENTS, TO GEORGE K. WOODWORTH, TRUSTEE, OF BROOKLINE, MASSACHUSETTS.

INTERNAL-COMBUSTION ENGINE.

1,335,320.      Specification of Letters Patent.      Patented Mar. 30, 1920.

Application filed April 5, 1915. Serial No. 19,265.

*To all whom it may concern:*

Be it known that I, FRED HENRY GILE, a citizen of the United States, and a resident of Saugus, in the county of Essex and State of Massachusetts, have invented a new and useful Improvement in Internal-Combustion Engines, of which the following is a specification.

My invention relates to internal combustion engines and more especially to engines of the combined pump and motor cylinder type, either single or double acting, and its objects are to improve and simplify the construction thereof and increase the efficiency of the same in the manner hereinafter set forth.

The drawings which accompany and form a part of this specification show several illustrative embodiments of my invention, but it is to be understood that the construction herein particularly described may be widely varied without departing from the scope of my invention as defined by the appended claims.

In the drawings—

Figure 1 is a front view of a double-acting engine embodying my invention. Fig. 2 is a vertical longitudinal section, certain parts being shown in elevation. Fig. 3 is a side view. Fig. 4 is a longitudinal section on an enlarged scale of an oil pump that may be employed to lubricate the cylinder. Fig. 5 is a plan view of the cylinder with the cylinder-head removed. Fig. 6 is a similar view of a modification. Fig. 7 is a central longitudinal section taken on the line 7—7 of Fig. 6. Fig. 8 is a vertical longitudinal section of a single-acting engine embodying my invention. Fig. 9 is a plan view of a modified form of cylinder with the head removed. Fig. 10 is a fragmentary sectional view on the line 10—10 of Fig. 9.

In the particular drawings selected for more fully disclosing my invention, 1 represents a frame having a horizontal crank-shaft 2 suitably journaled therein and supporting the cylinder 3, the ends of which, in the present instance, are provided with a number of parallel fuel passages or flutes 4, 4' arranged lengthwise in its bore and communicating with the combustion chambers A A' respectively. While I do not limit myself to the number of flutes that may be employed I have found that from sixteen to twenty give good results. No hard and fast rule can be given as to the number of the flutes that will give the best results under all conditions of operation. They are not mere passageways or channels from the space between the pistons to the combustion chamber; but on the contrary they serve the additional function hereinafter more fully set forth of effecting a perfect or substantially perfect mixing of the charge of fuel and air. Their number depends in a way upon the volume of the cylinder and their total cross sectional area depends upon the cross sectional area of the intake port. There must be a relatively large number of flutes so as to thoroughly subdivide the charge and effect the complete mixing of the same. The total cross sectional area of the flutes must be such, due regard being had to the cubical contents of the cylinder and the cross sectional area of the intake port, that they will impose sufficient restraint to the passage of the gas therethrough as to enable the latter to acquire a relatively high velocity during such passage. Arranged to reciprocate within the cylinder is a hollow piston or sub-piston consisting of two imperforate heads 5 5' rigidly connected by the rods 6 herein shown as three in number, and the lower head is connected to or integral with the hollow piston-rod or sleeve 7, which in turn is secured to the cross-head 8 guided in the ways 9 on the engine frame. Arranged to reciprocate within the cylinder and within the hollow piston is a plunger or power piston 10 connected to or integral with the piston-rod 11 which passes axially through the lower head of the sub-piston and the hollow piston-rod 7, and is secured at its lower end to the cross-head 12 guided by the ways 9. The pitman 13 connects the cross-head 12 with the crank 14 to transmit the power developed in the cylinder to the main crank-shaft.

Pivotally connected to the studs 15 15' of the cross-head 8 are the connecting-rods 16, 16', one on either side of the pitman 13, and said connecting-rods engage the arms 17, 17' which are rigidly connected with the rock-shaft 18 journaled in the engine frame. Integral with or rigidly connected to the arm 17' is a shorter arm 17'', to which is pivoted the connecting-rod 19 which engages the outer end of the bell-crank 20 pivotally connected to the frame at 21.

The two arms of the bell-crank are bifurcated, and the rolls 22, 23, are journaled between the forks of the upper and lower arms respectively. The cams 24, 25, rotating with the main shaft engage the rolls 22, 23, respectively. Either one of the two cams is cut to communicate the proper motion to the arm of the bell-crank with which it coöperates, and then the other cam is so cut that the two rolls are always held positively in contact with their respective cams, thereby eliminating the necessity for the usual spring arrangement employed to maintain firm contact between a cam and its follower.

The cylinder is provided with exhaust passages 26, 26′ controlled by the inwardly-opening valves 27, 27′ normally held on their respective seats by the springs 28, 28′ which surround the valve stems and have their ends bearing against the outer walls of the exhaust passages and the collars 29, 29′ on the valve stems. Coöperating with ports in the cylinder-head extensions 30 are the outwardly opening automatic check-valves 31, 31′, each held on its seat by the relatively light springs 32, 32′ interposed between the collars 29, 29′ and the ends of their hollow stems 33, 33′, which, as shown, are guided in the bosses 34, 34′.

It will be understood of course that the exhaust valves may be operated by any suitable mechanism and in the present case I have illustrated a simple form of valve gearing comprising continuously rotating cams operatively connected with the power shaft. The tappet 35 secured to the rock-shaft 36 strikes the lower end of the stem of the valve 27, thereby forcing the same upwardly from its seat at the proper times, and said rock-shaft 36 is suitably connected through the rock-lever 37 and shifting-rod 38 to one of said continuously rotating cams 39 which coöperates with the collar 39′ on the lower end of said shifting-rod. The valve 27′ is raised from its seat at the proper times by the cam 40, which coöperates with the collar 40′ on the lower end of a short shifting rod which engages the lower end of its valve-stem. It will be understood of course that the valves are closed by their respective springs 28, 28′ as soon as the cams 39, 40 pass their coöperating elements.

The cams are secured to the cross-shaft 41 and the latter is shown in the present instance as connected with the power shaft by the diagonal intermediate shaft 42, having bearings 43, 43′ secured to the engine frame, and by the beveled gears 44, 45.

The fuel inlet 46, located substantially midway between the two ends of the cylinder, is connected by a pipe 46′ to any suitable source of fuel, herein shown as the carbureter 47, and connected with said pipe through another pipe provided with a valve 48 is a tank 49 which may contain another kind of fuel or else a non-combustible such as water.

For lubricating the cylinder, I prefer the pump shown in Fig. 4, which communicates with the longitudinal duct 50 passing through the piston-rod 11 and intersecting the transverse ducts 51 in the power piston, said transverse ducts being shown herein as three in number and intersecting the bores in the power piston through which the rods 6 pass. The pump is supported by the bracket 52 which is connected to the cross-head 12 and comprises a barrel 53 carrying a plunger 54, the head 55 of which normally held in retracted position by the surrounding spiral spring 56 is arranged to strike the adjustable stop 57 during the reciprocation of said cross-head. The tube 58 connects the bottom of a chamber 59 with the lower portion of the pump barrel and a tube 60 communicates between said chamber and the duct 50 in the piston-rod. A tube 61 connects the bottom of the barrel with the bottom of the lower member of a pair of telescoping tubes 62, 63, the upper member of which is connected by the pipe 64 to a source of lubricating oil. Valves of any suitable type, herein shown as gravity-actuated ball valves 64′, 65, normally close the lower ends of the pump barrel 53 and the chamber 59 respectively.

It will be understood of course that the foregoing detailed description comprises various elements which in the precise form shown in the drawings and described herein are not essential to my invention and that these parts may be considered simply as typical of the necessary elements of an internal combustion engine.

The salient feature of my invention consists, generally speaking, in apparatus for and the method of introducing and compressing a charge of gaseous or atomized combustible and air in the cylinder and so thoroughly, intimately and completely mixing the same during compression that complete combustion of the charge in the cylinder will result on ignition without producing free carbon or unburnt gases in the exhaust. Heretofore only an incomplete and by no means perfect mixing of the charge of fuel and air and combustion of the same above the piston have been attained, a portion of the unconsumed fuel being burned during its passage through the exhaust pipe and the balance being expelled therefrom, thereby greatly reducing the efficiency of the engine. These defects are overcome by my invention. Among the results obtained by such perfect and intimate mixture of the charge and the resulting complete combustion thereof are a greatly increased efficiency, the reduction of fuel required to develop a given power, the absence of smoke, unconsumed gases and fire in the exhaust, this resulting in an odorless exhaust, the ability more readily to cool the cylinder, and a practically silent exhaust thereby obviating the necessity for a muffler. Also by virtue of such perfect mixture my engine will develop the same power at one quarter of the speed required for the usual four-cycle engine having the same dimensions.

The means whereby I secure the intimate and perfect mixture of fuel and air above referred to are the flutes or fuel passages 4, 4' in the bore of the cylinder shown in Fig. 2 as arranged at the ends thereof. As the power piston approaches the head of the hollow piston the charge which is contained in the space between these two elements is compressed and forced by such compression around the advancing head of the hollow piston through a restricted passage such as that afforded by the flutes or fuel passages and is shot with great force against a solid body, which in the present instance is the cylinder head, in a number of relatively small streams, the number of said streams being sufficiently large to effect such a thorough, intimate and complete mixing of the charge that substantially complete combustion of the same in the cylinder will result on ignition.

An explosion of the compressed charge in either combustion chamber acts directly on one of the heads of the sub-piston and by the latter is communicated to the power piston, with which such head is then in contact as shown in Fig. 2. It is absolutely necessary that the two pistons shall travel at the same rate of speed without the slightest relative movement until the hollow piston, or sub-piston, shall have covered the inner ends of the adjacent set of flutes, and it is essential that the subsequent relative movement between the pistons be created positively and that the sub-piston be controlled positively as distinguished from the construction shown in my prior Letters Patent No. 735,964, dated August 11, 1903, which has a flying piston somewhat similar in form to the hollow piston of the present invention, but not controlled positively nor arranged for positive relative movement with respect to the power piston; and it is highly desirable that they shall remain in contact until the end of the power-stroke of the sub-piston or during a substantial portion of such power-stroke.

It will be obvious that the means governing the movement of the hollow piston must be very carefully designed to prevent any relative movement with respect to the power piston until the hollow piston shall have nearly reached the end of its stroke, and particularly until the trailing head of the hollow piston shall have covered the inner ends of the adjacent set of flutes. The reason for this will be obvious from an inspection of Fig. 2, in which the parts are shown in the position occupied immediately prior to ignition in the combustion chamber A. Should the power piston begin to move away from the upper head 5 of the sub-piston before the latter covers the inner ends of the flutes 4, a portion of the effect of the explosion will be exerted against the lower face of said head 5 in opposition to the force exerted on the upper face thereof. This will result in the creation of a relatively high pressure in the trailing end of the hollow piston which will prevent the subsequent movement of the power piston with respect to the sub-piston from drawing a charge of fuel through the inlet 46 into the trailing end of the hollow piston. The necessity for the construction in question will also be manifest from an examination of Fig. 8 hereinafter referred to.

The hollow piston is governed or controlled throughout the entire cycle by the cams 24, 25, which as above described, operate the bell-crank 20 and the latter is connected through the motion-reducing connection 17', 17'' with the cross-head 8. The cams are so designed and are so related to the crank 14 that both pistons travel in the same direction, for example downwardly having reference to Fig. 2, at the same initial rate of speed and without relative motion until the lower head 5' of the hollow piston nearly reaches the bottom of the cylinder, then while the power piston is continuing its descent, the sub-piston is slightly recalled until the upper face of its lower head 5' is a little below the inner ends of the flutes 4', in which position the cam surfaces are concentric with the power shaft and consequently the sub-piston is held stationary until the power piston reaches the end of its stroke.

While it will be understood that the several moving parts may be variously adjusted and timed, I prefer such adjustment and timing as will produce the following cycle:

When both pistons are at the upper end of their strokes, the upper head 5 of the sub-piston being in contact with the power piston, as shown in Fig. 2, and the charge compressed in the combustion chamber A, the valve 27 being closed and the valve 27' open, the charge is fired and the resulting explosion causes both pistons to descend at the same rate of speed and without any relative movement until the sub-piston nearly reaches the bottom of the cylinder driving the burnt gases of the preceding explosion out of the combustion chamber A' and through the exhaust passage 26'.

The sub-piston is now recalled until the upper face of its lower head 5' is slightly below the inner ends of the flutes 4' and the lower face of its upper head 5 slightly above the fuel inlet 46, in which position it remains stationary until driven upwardly by the next explosion in the combustion chamber A'.

The power piston 10 continues its descent and, after uncovering the fuel inlet 46, creates a partial vacuum within the trailing end of the hollow or sub-piston and draws a charge of fuel through said inlet into the space between its upper face and the lower face of the upper head 5 of said hollow piston. It will be noted that the fuel inlet is never suddenly placed in communication with said space at a time when there is a high degree of vacuum therein which would result in the forcible injection of a charge of fuel and the production of "flooding," and that the admission of the charge is effected gradually and progressively by the movement of the power piston away from one of the heads of the sub-piston, such admission continuing until the power piston has reached the end of its stroke. At the same time the plunger or power piston 10 compresses the charge in the advancing end of the hollow piston, i. e., in the space between its lower face and the upper face of the lower head 5' of said hollow piston, a charge of fuel having been drawn into said space on the preceding up-stroke of the pistons, and a portion of this charge so compressed by said plunger passes through the flutes 4' into the combustion chamber A', thereby completing the scavenging of the latter.

The valve 27' now closes and the power piston continues its downward stroke further compressing the charge and driving the same with great force through the flutes 4' into the combustion chamber A' thereby shooting the charge against the cylinder head in a plurality of relatively small streams. It will be noted that the compression of the charge is continuous and increases progressively until the power piston reaches the end of its stroke, and that the charge is not permitted to expand after having reached its maximum pressure until it is fired.

The compressed charge is now exploded and both pistons driven upwardly, the valve 27 opening prior to the explosion. Both pistons rise at the same rate of speed until the upper head 5 of the sub-piston nearly reaches the top of the cylinder, scavenging the combustion chamber A through the exhaust passage 26 and thereby preventing the admixture of the next charge with the burned gases resulting from the previous explosion. The sub-piston is then recalled until the lower face of the upper head 5 is slightly above the inner ends of the flutes 4 and the upper face of its lower head 5' is slightly below the fuel inlet 46 whereupon it remains stationary until driven downwardly by the next explosion in the combustion chamber A.

The power piston continuing its ascent draws a charge of fuel from the inlet 46 into the trailing end of the hollow piston, i. e., the space between its own lower face and the upper face of the lower head 5', and compresses the charge in the advancing end of said hollow piston, i. e., the space between its own upper face and the lower face of the upper head 5. The scavenging of the combustion chamber A is completed by a portion of the compressed charge passing thereinto by way of the flutes 4, whereupon the valve 27 is closed and the continued upward stroke of the power piston drives the rest of the fuel charge through said flutes into said combustion chamber and completes the compression thereof.

Ignition then occurs again and the cycle is repeated, there being one explosion at each end of every stroke or two per revolution of the crank-shaft.

In the foregoing description of the cycle no reference has been made to the outwardly-opening check-valves 31, 31', which are removably held on their respective seats by the relatively light springs 32, 32', but it will readily be understood by inspection of Fig. 2, that every time one of the exhaust valves 27, 27' is opened mechanically, the pressure of the exhaust gas will open the coöperating check valve.

When one of the heads of the hollow piston uncovers the flutes in either end of the cylinder, the space between such head of said hollow piston and the power piston, i. e., the advancing end of the hollow piston, is brought into communication with the combustion chamber by way of said flutes before the power piston begins to compress the charge in said space and, therefore, inasmuch as there is usually a partial vacuum in said space unless the engine is running at full load, it is desirable to provide automatic check-valves such as shown at 31, 31', or check-valves of any other suitable construction, to prevent any portion of the exhaust or the outside air from being drawn through the combustion chamber into said space by way of the flutes. I have found that such automatic check-valves greatly increase the efficiency of the engine.

During the up-stroke (or in-stroke) of the cross-head 12, the plunger 54 of the oil pump will cause a quantity of oil to be forced through the tube 58 into the chamber 59 and thence by way of the tube 60 and duct 50 to the transverse ducts 51 in the power piston head, thereby spreading on the interior wall of the cylinder 3 a coating of oil that has not been injured by the fire of the exploding charge, and at the same time the rods 6 are thoroughly lubricated to facilitate their passage through the power piston. At every down-stroke (or out-stroke) of the power piston the bracket 52 carries the lubricating pump downwardly and the spring 56 by retracting the plunger 54 from the lower end of the pump barrel causes a fresh charge of oil to be drawn from the source connected to the pipe 64 through the telescopic pipes 62, 63 and thence into the pump barrel.

Although I have shown a carbureter of the usual commercial type connected to the fuel inlet 46, it will be understood that my engine does not require this attachment and that any suitable device may be employed for introducing fuel and air in the cylinder, such fuel being in either gaseous or liquid form, and if in liquid form it may or may not be atomized. I have found that it is by no means necessary to use a highly combustible fuel, such as gasolene, inasmuch as crude oil or kerosene may be employed, and I may also use alcohol or illuminating gas.

Under certain conditions, the operation of the engine is improved by injecting water into the cylinder from a source such for example as the tank 49 connected through the valve 48 with the fuel inlet pipe, the connection in the present instance being shown as between the carbureter and the cylinder, although this is not essential.

As I now understand the operation of my engine, when a non-combustible such as water is injected into the cylinder with a combustible, the effect of such non-combustible is to lower the temperature of the compressed charge and to permit a much higher compression of the same without developing a temperature sufficiently high to produce pre-ignition; or else to so dilute a fuel charge which does not have the necessary quantity of air to effect complete combustion that complete combustion of the mixture of the charge so diluted and the air available is obtained.

It has been found in practice that by compressing the charge of hydrocarbon fuel and air in the space between the sub-piston and plunger and transferring the same during compression to the combustion chamber through a relatively large number of passages such for example as those shown and described herein and forcibly impelling the same against a solid body such as the cylinder head in a corresponding number of relatively small streams, there is obtained such a thorough, intimate and complete mixing of the charge of hydrocarbon fuel and air that substantially complete combustion of the same in the cylinder and above the piston will result on ignition.

While in Fig. 2 I have shown the flutes arranged at the end of the bore of the cylinder, and while such arrangement is at present preferred by me, it is not essential that they extend clear up to the end of the cylinder, for as shown at 66 in Figs. 9 and 10, they may be located near the end of the cylinder, terminating a short distance from the end thereof.

In Fig. 10 the relative positions of the upper head 5 of the sub-piston, and the power piston 10, immediately preceding ignition are shown in dotted lines.

As indicated in Fig. 7, the fuel passages may consist of ducts 67 bored in the wall of the cylinder, in which case the outlet of said ducts to the combustion chamber may be covered by a ring 68 which rests on the upper end of the cylinder by its own weight until the advancing head of the sub-piston uncovers the transverse portion of said ducts and the compressed charge is forced by the power piston through said ducts and against said ring whereupon the latter, acting as an automatic check-valve, rises and permits the passage of said charge to the combustion chamber. When this construction is employed, the automatic check-valves 31, 31' shown in Fig. 2, may be omitted. It will be obvious that if the modification shown in Fig. 7 is employed in a horizontal engine, the ring 68 will be provided with any suitable resilient means for holding it on its seat.

It will be apparent that by means of the engine above described, the scavenging of the burnt or dead gases is effected by the combined mechanical action of the hollow piston and the pneumatic action of the compressed charge, and that by virtue of my automatic check-valves there is the least possible chance of contamination of the fresh charge of fuel; that the live gas or fuel is transferred to the combustion chamber during the last portion of the working stroke of the power piston in both directions; that the live fuel is thoroughly mixed while it is being admitted to the combustion chamber; that the admission of live gas or fuel and the discharge of spent or dead gas is effected positively and noiselessly, and that by virtue of the comparatively few parts required, the cost of my engine per unit of power is very low.

The underlying principle of my invention may also be applied to a single-acting engine, as shown in Fig. 8, which illustrates the left-hand unit of a two-cylinder single-acting engine. In this case the sub-piston 5 is rigidly connected by the rods 72 with the inwardly-projecting lugs 73 of a ring 74 arranged to reciprocate within the cylinder 3', said rods passing through bores extending throughout the entire length of the power piston 71 to more accurately guide the sub-piston. Connecting rods 75 pivotally engage studs 74' integral with the ring 74, and also the rock-levers 76 secured to the counter-shaft 77 located in bearings 77' on the rear of the engine frame 1', the ends of said rock-levers extending forwardly so that the connecting rods 75 are substantially vertical when the crank 14' is in the position shown in Fig. 8, space thus being provided for the swing of the pitman 13'. The counter-shaft is rocked by the bell-crank 20 and its coöperating cams, which have already been described in connection with Fig. 1, the link 79 and arm 78 communicating the motion of the bell-crank to the counter-shaft. The power piston 71 is suitably connected with the pitman 13' as for example by means of the wrist-pin 80 extending between the bosses 81 integral with said piston.

The operation will be understood from what has been explained in connection with Fig. 1,—suffice it to say that immediately before ignition the lower face of the sub-piston 5 is slightly above the inner ends of the flutes, that the explosion acts directly on the head of the sub-piston and by the latter is communicated to the power piston with which such head is then in contact as shown in Fig. 8, that both pistons travel at the same rate of speed and remain in contact until the sub-piston reaches substantially the end of its stroke, that a charge of fuel is drawn into the cylinder as soon as the power piston uncovers the fuel inlet 46''', and that the charge is compressed on the up-stroke and intimately mixed during compression by being shot with great force into the combustion chamber by way of the flutes. The operation of the exhaust valves and the scavenging of the combustion chamber is substantially the same as above set forth in connection with Fig. 1, the exhaust valve 27 opening prior to the commencement of the up-stroke of the sub-piston.

It will be understood that various modifications may be made without departing from the spirit of my invention.

Having thus described in detail several illustrative embodiments of my invention and explained the theory of operation thereof as I now understand it, without, however, limiting myself thereto, what I claim and desire to secure by Letters Patent is—

1. An internal combustion engine comprising a cylinder having exhaust passages at its opposite ends and a fuel inlet between its ends, a hollow piston reciprocating within the cylinder and adapted to have each end of its interior alternately connected with said fuel inlet and one end of said cylinder, a plunger reciprocating within the piston and means for causing positive relative movement of said piston and plunger.

2. An internal combustion engine comprising a cylinder having exhaust passages at its opposite ends and a fuel inlet between its ends, a hollow piston reciprocating within the cylinder and adapted to have each end of its interior alternately connected with said fuel inlet and one end of said cylinder, a plunger reciprocating within the piston and means for controlling said piston positively throughout the entire cycle.

3. An internal combustion engine comprising a cylinder, a hollow imperforate sub-piston arranged to reciprocate within said cylinder, a power piston arranged to reciprocate within said sub-piston, said sub-piston being located between said power piston and the combustion chamber, and means for causing positive movement of said pistons at the same initial rate of speed without relative movement, and for causing, subsequently, positive relative movement between the same.

4. An internal combustion engine comprising a cylinder, a hollow piston arranged to reciprocate within said cylinder, a power piston arranged to reciprocate within said hollow piston, a crank-shaft, two cams rotating with said crank-shaft, a bell-crank having its arms coöperating with said cams, respectively, a motion-reducing connection interposed between said bell-crank and said hollow piston and a pitman connecting said power piston with said crank-shaft.

5. An internal combustion engine comprising a cylinder, a sub-piston arranged to reciprocate within said cylinder, a power piston, said sub-piston being located between said power piston and the combustion chamber, a crank-shaft, two cams rotating with said crank-shaft, a bell-crank having its arms coöperating with said cams, respectively, a motion-reducing connection interposed between said bell-crank and said sub-piston and a pitman connecting said power piston with said crank-shaft.

6. An internal combustion engine having exhaust passages at its opposite ends and a fuel inlet between its ends, a sub-piston within said cylinder and adapted to have each end of its interior alternately connected with said fuel inlet and one end of said cylinder, a plunger within said sub-piston, said sub-piston comprising two heads, one on each side of said plunger, means rigidly connecting said heads and means for controlling said sub-piston positively throughout the entire cycle.

7. An internal combustion engine having exhaust passages at its opposite ends and a fuel inlet between its ends, a sub-piston within said cylinder and adapted to have each end of its interior alternately connected with said fuel inlet and one end of said cylinder, a plunger within said sub-piston, said sub-piston comprising two heads, one on each side of said plunger, rods passing through said plunger and connecting said heads, and means for controlling said sub-piston positively throughout the entire cycle.

8. An internal combustion engine comprising a cylinder provided at each end with an exhaust passage and with a plurality of fuel-conducting grooves arranged lengthwise in the bore of the cylinder, a plunger, a sub-piston within said cylinder, said sub-piston comprising two heads, one on each side of said plunger, and means rigidly connecting said heads, said sub-piston when at the end of its stroke in either direction having the outer face of its advancing head arranged short of the outer ends of said grooves at the corresponding end of said cylinder and the inner face thereof arranged beyond the inner ends of said grooves.

9. An internal combustion engine comprising a cylinder, a sub-piston arranged to reciprocate within said cylinder, a plunger arranged to reciprocate within said sub-piston, said sub-piston comprising two heads, one on each side of said plunger, means rigidly connecting said heads, and means for causing positive movement of said sub-piston and plunger at the same initial rate of speed without relative movement and for causing, subsequently, positive relative movement between the same.

10. An internal combustion engine comprising a cylinder, a sub-piston arranged to reciprocate within said cylinder, a plunger arranged to reciprocate within said sub-piston, and means for causing said plunger and sub-piston to travel at the same rate of speed without relative movement until the sub-piston reaches substantially the end of its stroke, for recalling said sub-piston a short distance in the opposite direction and for holding the same stationary until the plunger reaches the end of its stroke.

11. An internal combustion engine comprising a cylinder, an imperforate sub-piston arranged to reciprocate within said cylinder, a plunger arranged to reciprocate within said sub-piston, means for causing positive movement of said sub-piston and plunger at the same initial rate of speed without relative movement and for causing, subsequently, positive relative movement between the same, and means whereby a charge of fuel in said cylinder is transferred under pressure from the space between said sub-piston and plunger through a restricted passage to the combustion chamber.

12. An internal combustion engine comprising a cylinder, a sub-piston arranged to reciprocate within said cylinder, a plunger arranged to reciprocate within said sub-piston, means for causing positive movement of said sub-piston and plunger at the same initial rate of speed without relative movement and for causing, subsequently, positive relative movement between the same, and means whereby a charge of fuel in said cylinder is transferred under pressure from the space between said sub-piston and plunger to the combustion chamber in a plurality of relatively small streams.

13. An internal combustion engine comprising a cylinder having a set of fuel passages arranged in its bore at each end thereof and communicating, respectively, with the combustion chambers of the engine, a sub-piston arranged to reciprocate within said cylinder, a plunger arranged to reciprocate within said sub-piston, and means for causing positive movement of said sub-piston and plunger at the same initial rate of speed without relative movement and for causing, subsequently, positive relative movement between the same.

14. An internal combustion engine comprising a cylinder having a plurality of fuel passages arranged lengthwise in its bore at one end thereof, a power piston, a sub-piston, said sub-piston being located between said power piston and the combustion chamber, and means for causing positive movement of said sub-piston and power piston at the same initial rate of speed without relative movement and for causing, subsequently, positive relative movement between the same.

15. An internal combustion engine comprising a cylinder having a plurality of fuel passages arranged in its bore near one end thereof, said passages communicating with the combustion chamber of the engine, a power piston, a sub-piston, said sub-piston being located between said power piston and the combustion chamber, and means for causing positive movement of said sub-piston and power piston at the same initial rate of speed without relative movement and for causing, subsequently, positive relative movement between the same.

16. An internal combustion engine comprising a cylinder, a sub-piston arranged to reciprocate within said cylinder, a plunger arranged to reciprocate within said sub-piston, said sub-piston comprising two heads, one on each side of said plunger, means rigidly connecting said heads, means for causing positive movement of said sub-piston and plunger at the same initial rate of speed without relative movement and for causing, subsequently, positive relative movement between the same, and means whereby a charge of fuel in said cylinder is transferred under pressure from the space between said sub-piston and plunger through a restricted passage to the combustion chamber.

17. An internal combustion engine comprising a cylinder, a sub-piston arranged to reciprocate within said cylinder, a plunger arranged to reciprocate within said sub-piston, said sub-piston comprising two heads, one on each side of said plunger, means rigidly connecting said heads, means for causing positive movement of said sub-piston and plunger at the same initial rate of speed without relative movement and for causing, subsequently, positive relative movement between the same, and means whereby a charge of fuel in said cylinder is transferred under pressure from the space between said sub-piston and plunger to the combustion chamber in a plurality of relatively small streams.

18. An internal combustion engine comprising a cylinder, a power piston, a sub-piston having two heads, one on each side of said power piston, rods rigidly connecting said heads, said rods passing through said power piston, and means for causing positive movement of said power piston and sub-piston at the same initial rate of speed without relative movement and for causing, subsequently, positive relative movement between the same.

19. An internal combustion engine comprising a cylinder, a power piston, a piston rod connected thereto, a sub-piston having two heads, one located on each side of said power piston, rods rigidly connecting said heads, said rods passing through said power piston, a hollow piston rod connected to said sub-piston and inclosing the rod of said power piston, and means for causing positive movement of said power piston and sub-piston at the same initial rate of speed without relative movement and for causing, subsequently, positive relative movement between the same.

20. An internal combustion engine comprising a cylinder, a power piston, an imperforate sub-piston located between said power piston and combustion chamber, and means for causing positive movement of said sub-piston and power piston at the same initial rate of speed without relative movement and for causing, subsequently, positive relative movement between the same.

21. An internal combustion engine comprising a cylinder, an imperforate sub-piston arranged to reciprocate within said cylinder, a power piston arranged to reciprocate within said sub-piston, said sub-piston comprising two heads, one on each side of said power piston, means rigidly connecting said heads, and means for causing one head of said sub-piston to travel in contact with the power piston during a substantial portion of the power stroke and for causing, subsequently, positive relative movement between said pistons.

22. An internal combustion engine comprising a cylinder, an imperforate sub-piston arranged to reciprocate within said cylinder, a power piston arranged to reciprocate within said sub-piston, said sub-piston comprising two heads, one on each side of said power piston, means rigidly connecting said heads, a crank-shaft, and means actuated by said crank-shaft for causing one head of said sub-piston to travel in contact with the power piston during a substantial portion of the power stroke and for causing, subsequently, positive relative movement between said pistons.

23. An internal combustion engine comprising a cylinder, a power piston and a sub-piston both arranged to reciprocate within said cylinder, a crank-shaft, two cams rotating with said crank-shaft, a bell crank pivoted in proximity to said crank-shaft and having its arms coöperating with said cams, respectively, one of said cams being shaped to communicate the proper motion to the arm of the bell crank with which it coöperates and the other cam being so shaped that the two arms are always held positively in contact with their respective cams, a connection between said crank-shaft and said power piston, and means connecting one arm of said bell crank to said sub-piston, said sub-piston being located between said power piston and the combustion chamber.

24. An internal combustion engine comprising a cylinder, a power piston, said power piston constituting means for compressing a charge of fuel and air in said cylinder, an imperforate sub-piston located between said power piston and combustion chamber and positively controlled throughout the entire cycle, said pistons being arranged to reciprocate within said cylinder and said sub-piston to travel in contact with said power piston during a substantial portion of the power stroke, and means whereby said charge of fuel and air is so thoroughly, intimately and completely mixed during such compression that substantially complete combustion of the same in the cylinder will result on ignition.

25. An internal combustion engine comprising a cylinder, a power piston, said power piston constituting means for compressing a charge of fuel and air in said cylinder, an imperforate sub-piston located between said power piston and combustion chamber and positively controlled throughout the entire cycle, said pistons being arranged to reciprocate within said cylinder and said sub-piston to travel in contact with said power piston during a substantial portion of the power stroke, and means whereby said charge of fuel and air during such compression is transferred to the combustion chamber under pressure in a plurality of relatively small streams sufficiently numerous to effect such a thorough, intimate and complete mixing of said charge that substantially complete combustion of the same in the cylinder will result on ignition.

26. An internal combustion engine comprising a cylinder, a power piston, said power piston constituting means for compressing a charge of fuel and air in said cylinder, an imperforate sub-piston located between said power piston and combustion chamber and positively controlled throughout the entire cycle, said pistons being arranged to reciprocate within said cylinder and said sub-piston to travel in contact with said power piston during a substantial portion of the power stroke, and means whereby said charge of fuel and air during such compression is transferred to the combustion chamber under pressure through such a relatively large number of passages that the charge is completely mixed and substantially complete combustion of the same in the cylinder obtained on ignition.

27. An internal combustion engine comprising a cylinder, a power piston, said power piston constituting means for compressing a charge of fuel and air in said cylinder, an imperforate sub-piston located between said power piston and combustion chamber and positively controlled throughout the entire cycle, said pistons being arranged to reciprocate within said cylinder and said sub-piston to travel in contact with said power piston during a substantial portion of the power stroke, and means whereby said charge of fuel and air during such compression is transferred to the combustion chamber under pressure through a relatively large number of passages and forcibly impelled against the cylinder head in a corresponding number of relatively small streams, the number of said passages being sufficiently large to effect such a thorough, intimate and complete mixing of said charge that substantially complete combustion of the same in the cylinder will result on ignition.

28. An internal combustion engine comprising a cylinder, a power piston, said power piston constituting means for compressing a charge of fuel and air in said cylinder, an imperforate sub-piston located between said power piston and combustion chamber and positively controlled throughout the entire cycle, said pistons being arranged to reciprocate within said cylinder and said sub-piston to travel in contact with said power piston during a substantial portion of the power stroke, and means whereby said charge of fuel and air is transferred under pressure from said cylinder to the combustion chamber through a relatively large number of passages and forcibly impelled against a solid body in a corresponding number of relatively small streams, the number of said passages being sufficiently large to effect such a thorough, intimate and complete mixing of said charge that substantially complete combustion of the same in the cylinder will result on ignition.

29. An internal combustion engine comprising a cylinder, an imperforate sub-piston and a power piston both arranged to reciprocate within said cylinder, said sub-piston being located between said power piston and the combustion chamber, and means for causing said sub-piston to travel in contact with said power piston during a substantial portion of the power stroke and for causing, subsequently, positive relative movement between said pistons.

30. An internal combustion engine comprising a cylinder, an imperforate sub-piston and a power piston both arranged to reciprocate within said cylinder, said sub-piston being located between said power piston and the combustion chamber, a crank-shaft, and means actuated by said crank-shaft for causing the sub-piston to travel in contact with the power piston during a substantial portion of the power stroke and for causing, subsequently, positive relative movement between said pistons.

31. An internal combustion engine comprising a cylinder, an imperforate sub-piston and a power piston both arranged to reciprocate within said cylinder, said sub-piston being located between said power piston and the combustion chamber, and cam-actuated means for causing the sub-piston to travel in contact with the power piston during a substantial portion of the power stroke and for causing, subsequently, positive relative movement between said pistons.

32. An internal combustion engine comprising a cylinder, an imperforate sub-piston and a power piston both arranged to reciprocate within said cylinder, said sub-piston being located between said power piston and the combustion chamber, a crank-shaft, and cam means actuated by said crank-shaft for causing the sub-piston to travel in contact with the power piston during a substantial portion of the power stroke and for causing, subsequently, positive relative movement between said pistons.

33. An internal combustion engine comprising a cylinder, an imperforate sub-piston and a power piston both arranged to reciprocate within said cylinder, said sub-piston being located between said power piston and the combustion chamber and means for causing said sub-piston to travel in contact with said power piston substantially until the end of the outstroke of said sub-piston and for causing, subsequently, positive relative movement between said pistons.

34. An internal combustion engine comprising a cylinder, an imperforate sub-piston and a power piston both arranged to reciprocate within said cylinder, said sub-piston being located between said power piston and the combustion chamber and cam-actuated means for causing said sub-piston to travel in contact with said power piston substantially until the end of the outstroke of said sub-piston and for causing, subsequently, positive relative movement between said pistons.

35. An internal combustion engine comprising a cylinder, an imperforate sub-piston and a power piston both arranged to reciprocate within said cylinder, said sub-piston being located between said power piston and the combustion chamber, and means for controlling said sub-piston positively throughout the entire cycle, said means being constructed and arranged to cause said sub-piston to travel in contact with said power piston during a substantial portion of the power stroke and to cause, subsequently, relative movement between said pistons.

36. An internal combustion engine comprising a cylinder, an imperforate sub-piston and a power piston both arranged to reciprocate within said cylinder, said sub-piston being located between said power piston and the combustion chamber, and means for controlling said sub-piston positively throughout the entire cycle and for causing the same to travel in contact with said power piston substantially until the end of the outstroke of said sub-piston.

37. An internal combustion engine comprising a cylinder, an imperforate sub-piston and a power piston both arranged to reciprocate within said cylinder, said sub-piston being located between said power piston and the combustion chamber, and means for controlling said sub-piston positively throughout the entire cycle and for causing the same to travel in contact with said power piston during a substantial portion of the power stroke.

38. The method of operating an internal combustion engine which consists in introducing a charge of fuel and air into the cylinder, transferring the same under pressure to the combustion chamber without admixture with the burned gases of the previous explosion and forcibly impelling said charge against the cylinder head in a plurality of relatively small streams sufficiently numerous to effect such a thorough, intimate and complete mixing of said charge that substantially complete combustion of the same in the cylinder will result on ignition.

39. The method of operating an internal combustion engine which consists in introducing a charge of fuel and air into the cylinder, transferring the same under pressure to the combustion chamber without admixture with the burned gases of the previous explosion and forcibly impelling said charge against a solid body in a plurality of relatively small streams sufficiently numerous to effect such a thorough, intimate and complete mixing of said charge that substantially complete combustion of the same in the cylinder will result on ignition.

40. The method of preparing gaseous fuel for combustion which consists in introducing a charge of hydrocarbon fuel and air into a container and transferring the same under pressure to another container without admixture with other gases in the latter through passages sufficiently numerous to effect such a thorough, intimate and complete mixing of said charge that substantially complete combustion of the same will result on ignition.

41. The method of preparing gaseous fuel for combustion which consists in introducing a charge of hydrocarbon fuel and air into a container, transferring the same under pressure to another container without admixture with other gases in the latter and forcibly impelling said charge against a solid body in a plurality of relatively small streams sufficiently numerous to effect such a thorough, intimate and complete mixing of said charge that substantially complete combustion of the same will result on ignition.

42. An internal combustion engine comprising a cylinder, a power piston arranged to reciprocate within said cylinder, means whereby a charge of fuel and air is drawn into said cylinder on the power stroke of said piston, and means whereby said charge is transferred under pressure during the compression stroke of said piston from said cylinder to the combustion chamber through a relatively large number of passages and forcibly impelled against the cylinder head in a corresponding number of relatively small streams, the number of said passages being sufficiently large to effect such a thorough, intimate and complete mixing of said charge that substantially complete combustion of the same in the cylinder will result on ignition.

43. An internal combustion engine comprising a cylinder, and means whereby a charge of fuel and air is transferred on the compression stroke to the combustion chamber through a relatively large number of passages and forcibly impelled against the cylinder head in a corresponding number of relatively small streams, the number of said passages being sufficiently large to effect such a thorough, intimate and complete mixing of said charge that substantially complete combustion of the same in the cylinder will result on ignition.

44. An internal combustion engine comprising a cylinder, a power piston arranged to reciprocate within said cylinder, means whereby a charge of fuel and air is drawn into said cylinder on the power stroke of said piston, and means whereby said charge is transferred under pressure during the compression stroke of said piston from said cylinder to the combustion chamber through a relatively large number of passages and forcibly impelled against a solid body in a corresponding number of relatively small streams, the number of said passages being sufficiently large to effect such a thorough, intimate and complete mixing of said charge that substantially complete combustion of the same in the cylinder will result on ignition.

45. Means for preparing gaseous fuel for combustion comprising a container, means for introducing a charge of hydrocarbon fuel and air into said container, a second container, means whereby said charge is transferred under pressure from the first to the second container through a relatively large number of passages, the number of such passages being sufficiently large to effect such a thorough, intimate and complete mixing of said charge that substantially complete combustion of the same will result on ignition, and means for preventing said charge from commingling with other gases in the second container.

46. Means for preparing gaseous fuel for combustion comprising a container, means for introducing a charge of hydrocarbon fuel and air into said container, a second container, means whereby said charge is transferred under pressure from the first to the second container through a relatively large number of passages and forcibly impelled against a solid body in a corresponding number of relatively small streams, the number of such passages being sufficiently large to effect such a thorough, intimate and complete mixing of said charge that substantially complete combustion of the same will result on ignition, and means for preventing said charge from commingling with other gases in the second container.

47. An internal combustion engine comprising a cylinder, means whereby a charge of fuel and air is introduced into said cylinder, means whereby said charge is transferred under pressure from said cylinder to the combustion chamber through a relatively large number of passages and forcibly impelled against a solid body in a corresponding number of relatively small streams, the number of said passages being sufficiently large to effect such a thorough, intimate and complete mixing of said charge that substantially complete combustion of the same in the cylinder will result on ignition, and means for preventing said charge from commingling with the burned gases of the previous explosion.

In testimony whereof I have hereunto subscribed my name this 3rd day of April, 1915.

FRED HENRY GILE.

Witnesses:
E. B. TOMLINSON,
GEO. K. WOODWORTH.